Feb. 6, 1951 R. E. WATTENBARGER 2,540,769
SURVEY ROD
Filed May 10, 1949
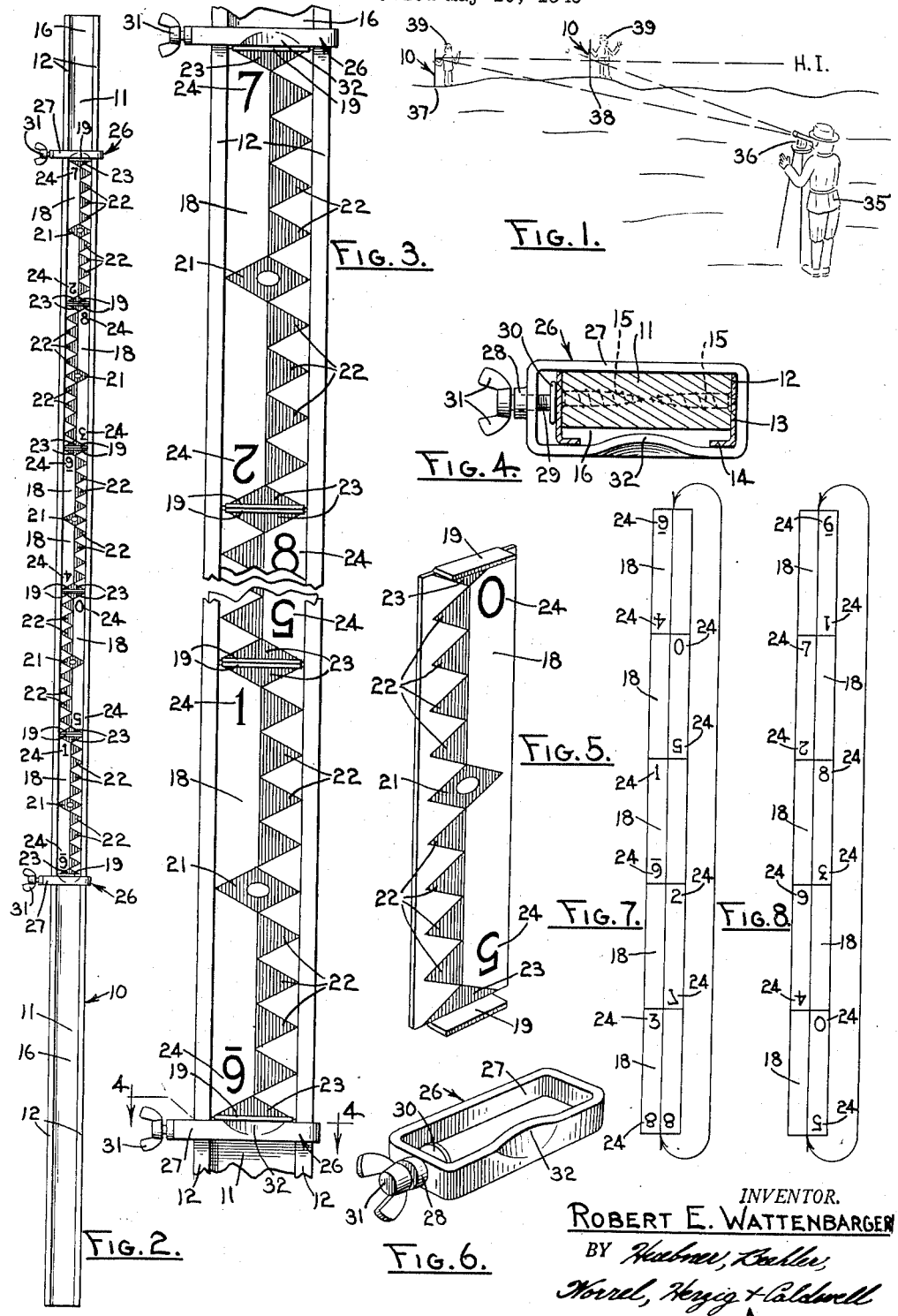
INVENTOR.
ROBERT E. WATTENBARGER Patented Feb. 6, 1951

2,540,769

UNITED STATES PATENT OFFICE 2,540,769

SURVEY ROD

Robert E. Wattenbarger, Madera, Calif.

Application May 10, 1949, Serial No. 92,328

4 Claims. (Cl. 33—74)

The present invention relates generally to surveying equipment and more particularly to a novel and improved survey rod.

In both plane surveying and geodetic surveying the determination of the relative positions of points on the earth's surface is based upon angular and linear measurements. Such measurements are conventionally determined by the use of the well-known transit, chain, and leveling or survey rod. The accurate determination of the desired measurements is dependent upon the skill of the operators and acceptable accuracy is not attainable by amateurs until they have had extensive experience. The employment of conventional survey rods is a source of considerable error and inaccuracy on the part of the amateur and of unnecessary work, figuring, and waste of time for the experienced operator.

In surveying for engineering projects and the like, experienced operators are generally available. In the leveling of agricultural fields and their maintenance in desired condition, however, the farmer must go to considerable expense to obtain the services of a trained surveyor or trust to his own normally inaccurate observations. In the irrigable lands of the western part of the United States, these inaccuracies are multiplied by the frequency with which it is desirable to alter the contour of the land, as for new crops having different irrigational requirements, or to return the land to a preexisting desired level or slope after cultivation, erosion, or other modifying influences have had their effect.

The need for accurate land surveys for farmers and the like, has rapidly increased, not only because of the vast increase in irrigated lands but because of the greater attention directed to erosion and other land deterioration incident to inadequate surface control. The present invention is directed not only to the provision of an improved survey rod readily available for accurate use by even the most inexperienced person but broadly to the obviating of errors, wasted effort and expense incident to the employment of the conventional survey rods by even the more experienced operators.

An object of the present invention is, therefore, to provide an improved survey rod that is convenient to use and simple to comprehend.

Another object of the invention is to provide a survey rod in which elevational departures from a predetermined point, line, or plane are read directly from the survey rod without computation.

Another object of the invention is to reduce reading errors in elevational surveying.

Another object of the invention is to provide a survey rod in which elevation indicating characters thereof are simply, quickly, and conveniently adjustable longitudinally of the rod for direct reading through a wide range of elevational readings.

Another object of the invention is to provide a survey rod that is economical to manufacture and to construct.

Another object is to provide an improved survey rod conducive to ease and accuracy in establishing successive bench marks, turning points, and the like.

Further objects are to provide improved elements and arrangements thereof in a device of the character set forth that is durable, economical, dependable, and fully effective for operation by a novice as well as the experienced operator.

Still further objects and advantages will become apparent in the subsequent description in the specification.

In the drawings:

Fig. 1 is a perspective view illustrative of the use of the survey rod of the present invention.

Fig. 2 is a front elevational view of an improved survey rod of the present invention.

Fig. 3 is a fragmentary enlarged front elevational view of the improved survey rod with the ends and a central portion thereof broken away for illustrative convenience.

Fig. 4 is a transverse sectional view taken through the survey rod as viewed from line 4—4 in Fig. 3.

Fig. 5 is a perspective view of one of a plurality of movable panels employed on the rod having indicating data displayed thereon.

Fig. 6 is a perspective view of one of the pair of clamping members employed to hold the panels in longitudinally adjusted position on the survey rod.

Figs. 7 and 8 are diagrammatic illustrations of two different arrangements of the plurality of longitudinally aligned panels demonstrating the utility thereof.

Referring in greater detail to the drawings:

The survey rod is indicated generally at 10 including an elongated rectangular body 11 and a pair of L-shaped clips 12 attached longitudinally along the edges of the body. The elongated body is illustrated as being made of wood, but may also be conveniently formed of other material, such as plastic, metal, or other suitable rigid material. Each of the L-shaped clips 12 cross-sectionally has a longer leg 13 and a shorter leg 14. The longer legs 13 are secured against opposite transverse edges of the body portion 11 by means of a plurality of wood screws 15. Bolts or other fastening means may be substituted for the screws 15, it being necessary that the clips be securely attached to the edges of the body. The shorter legs 14 are located in spaced parallel relation to the forward face of the elongated body so that in effect the shorter legs 14, the adjacent portion of the longer legs 13 and the forward face of the elongated body 11, delineate a channel 16 the entire length of the rod 10. Although the rod 10 is described as being of fabricated construction, the rod may also be formed of a single piece of material, with the body and the channel portion being formed integral, by forming the rod of extruded, molded, or die-cast material, such as plastic, or other material suitable for forming in the manner stated.

The channel 16 is adapted slideably to receive a plurality of panels longitudinally therein. Each of the panels 18 is formed from a substantially rectangular elongated piece of sheet metal having lips 19 extending normal to the plane of the sheet at each end of the panel. The distance between the outer sides of the pair of lips of each panel is preferably twelve inches. The lips 19 are slightly narrower than the distance between the legs 14 of the channel 16 so that the lips extend outwardly of each plate through the channel portion 16 with the lips of adjacent panels in abutting relation when the panels are stacked within the channel. The forward face of each of the panels 18 is provided with indicia, either printed or painted thereon, in a manner for distinguishable observation at an appreciable distance. The indicia displayed on the forward face of each panel divides the panel longitudinally into equal transverse spaces. A diamond 21 is preferably located for sighting convenience centrally of each panel indicating half panel length, or six inches, from the lips at the panel divisions. Each longitudinal half of the length of each panel is divided into fifths, or any other desired division, by means of a distinctively colored triangle at each division. Thus each panel is obviously calibrated longitudinally in tenths of a foot. The triangles 22 employed as sighting aids are preferably bilateral so that by sighting on their extended angles or base extremities the foot length of a panel is effectively divided into twentieths. The triangles indicating the twenty divisions are located, on their respective adjacent panels, on opposite sides of vertical center. At each end of each panel is displayed a triangle 23 of distinguishing color so that when the panels are in assembled relation in longitudinal abutting position in the channel 16, the abutting ends of adjacent panels display, in effect, a diamond symmetrically displayed adjacent to the line contact between the panels indicating the elevational dimension or location of the abutting ends of the panels.

Each panel has displayed thereon, adjacent each opposite longitudinal end, a distinguishing member 24 for indicating, in feet, the surveyed elevational readings. The numbers at the tops of the panels are erect and those at the bottoms of the panels inverted. When the panels are located in longitudinal abutting relation in the channel 16 of the rod 10, the indicating number at the upper end of each of the panels is displayed in an upright readable position and the number at the lower end of each of the panels is in an inverted, only inconveniently readable position. The plurality of indicating numbers display the gamut of numbers from zero to nine and the panels are printed with the above described pairs of numbers, one erect and the other inverted, the numbers of which pairs are different from each other by an amount of five digits. The individual panels are provided with pairs of indicating numbers as follows: 0–5, 1–6, 2–7, 3–8, and 4–9, respectively.

The panels are located in the channel 16 in a manner that in reading upwardly from zero, the upright numbers on each panel progressively decrease to a lesser number; i. e. 9, 8, 7, 6, and so forth. Reading the numbers downwardly from zero, the upright numbers progressively increase; i. e. 1, 2, 3, 4, and so forth. The panels are removable from the lower end of the channel 16 and insertable in an inverted position in the upper end of the channel 16, or may be removed from the upper end of the channel 16 and inserted in an inverted position in the lower end of the panel, and the panels brought into abutting relation. The panels are located in the channel 16 with the upright numbers in consecutively adjacent relation.

Means are provided for releasably securing the panels longitudinally in the channel 16 in the form of clamps 26. Each of the clamps is constructed of an endless length of strap metal 27 formed in the shape of an open rectangle having interior dimensions so that it will slideably circumscribe the rod 10 with an appreciable space at one side of the rod between the rod and the respective end of the strap. An outwardly extending boss 28 is formed integrally with one end portion of each of the straps 27 and has a screw threaded opening adapted to threadedly receive a screw 29 therethrough. An enlarged seat 30 is secured to the inner end of the screw 29 and a winged head 31 is provided at the outer end of the screw 29 for rotating convenience. By manual rotation of the winged head 31, the screw and seat 30 may be moved to a retracted position so that its resepctive clamp is slideable on the rod 10. The clamps 26 are located against opposite ends of the longitudinally abutting plurality of panels 18 and by manual rotation of the winged heads 31 the respective seats 30 may be brought tightly against the near edge of the rod 10 holding the clamps and the plurality of panels in position longitudinally of the rod. One edge of one longitudinal side of each strap 27 is bent inwardly, as at 32 so that each clamp more effectively engages the outwardly extending lip 19 of an adjacent panel.

The use of the survey rod of the present invention is illustrated in Fig. 1 of the drawing, in which figure is shown a transitman 35 observing the survey rod 10 in various positions through a tripod supported transit level 36. The survey rod is illustrated in two of numerous positions in which it would be cited in formulating an elevational chart of the land with the rod located in a depression 37 in one position and located on a mound 38 in another position being manually set and located by a rodman 39.

Operation

The operation and utility of the present invention is believed to be apparent from the foregoing description and is briefly summarized at this point. A permanent reference location is provided at an average level in the field to be surveyed, this location being called a "bench mark." This bench mark may be in the form of permanently located marker or a stake driven into the ground. The surveyor's transit level is located a distance from the bench mark, as is the normal practice. The survey rod is placed vertically on the bench mark and the rod man loosens clamps 26 on the rod 10 and moves the plurality of abutting panels vertically in the channel 16 until the zero mark on one of the panels is elevationally positioned in alignment with the cross-hair on the transit as sighted by the transitman. The clamps 26 are thereafter tightened, holding the panels longitudinally of the rod. Thus is established an arbitrary ten indication or reading at the same height as the horizontal center of the transit telescope. A number of survey shots are taken at various locations in the field and the elevations of the various locations are directly read from the rod and noted on a chart or map of the field in the usual manner.

When the survey rod is located vertically in a depression, such as the depression 37, lower than the elevation of the bench mark, the elevation is read upwardly from zero with the reading showing directly the elevation of the location in relation to the elevation of the bench mark. The reading will be less than ten, the sighting level arbitrarily assigned to the transit at the bench mark, as shown by the cross-hair on the transit, such as a position 9.10 or 8.55 and so forth. With the survey rod located vertically on a mound, such as 38, elevationally above the bench mark, the elevation will be read directly from the survey rod by the location of the cross-hair of the transit cited across the survey rod. The survey rod being on a mound, the elevation will be more than the arbitrary assigned 10 for the bench mark, such as an elevation of 11, 12.25, 13.70 and so forth. Each of the panels being one foot long and being divided longitudinally into twentieths of a foot, the elevations may be accurately noted and directly read. The inclined upper and lower sides of the triangles permits substantially accurate readings in more minute graduations than twentieths of a foot by observing the transit cross-hairs with relation to a side of a triangle 22.

When the survey rod of the present invention is located in a depression or on an elevation so that the calibrations of the rod are beyond the sighting plane of the transit, the calibrations are readily shifted upwardly or downwardly to rectify this condition within the limits of the length of the body 11. This is conveniently accomplished by holding one of the panels 18 fixedly in its original position, removing the clamps 26, taking successive panels from one end of the channel 16, inverting each of the panels thus removed, and reinserting them in the channel from the opposite end of the body 11 in the same sequence in which they were removed. Subsequently the clamps are repositioned, the panel still being held fixedly in position, and clamped in abutting relation with the end panels to locate the reassembled calibrations either upwardly or downwardly extended from their original position as desired. There being five panels numbered as described, it will be obvious that this manner of shifting the calibrations longitudinally of the body may be expeditiously accomplished throughout the length of said body. It will be obvious that the inverting of the panels keeps the numbers 24 in consistent relation to the original "10" point selected at transit height and that the triangles 22 on adjacent panels will continue to be oppositely extended for visual convenience.

In some instances the survey rod itself may be located in a depression, on a mound, or so remote that it is out of range of the telescope of the transit. In such instances, a turning point must be established so that the survey rod is brought into range of the transit. To establish a turning point, a stake or the like is driven into the ground where it is desired to establish the turning point. With the transit at its original location, the elevation of the turning point is directly read through the transit. The transit is thereafter moved from its original location and located at some point at a location convenient to the turning point, at a new bench mark, and vertical range of the rod. With the transit located at the new position, the elevation of the turning point is cited through the transit. From the difference in the direct readings of the rod at the turning points from the two transit positions, the relative elevations of said transit positions are readily established. When it is necessary to accommodate departures from the original instrument height greater than the length of the body 11, and such a turning point is employed, the panel 18 lying in the plane of the new instrument height is held fixedly in position by the rodman, and successive panels removed from one end of the channel and reinserted into the opposite end in the manner described above. It will readily be apparent that by working in this manner through successive turning points and new bench marks or transit positions, the rod may be constantly maintained in a direct reading condition with the only requisite mental computation being that of keeping track of the numbers of tens of feet removed from the original instrument height of the arbitrarily designated "10" the new rod calibration is. For example, it is necessary to keep track in shifting the panels every time the 0–5 panel is shifted so that the operator knows when he reads the rod whether the numeral sighted should have a 1, 2, or greater number in front of it indicating the rod position for example to be 17, 27, or a greater distance above or below the original instrument height. Of course, it is also necessary for the transitman to keep in mind whether he is working upwardly or downwardly in traversing terrain of uneven contour, but this presents no difficulty whatsoever, and the limitless, direct reading of elevations and depressions of any desired extent from the rod of the present invention through the selection of successive turning points is believed obvious.

From the foregoing description it will be noted that an improved survey rod is provided that is easily understandable and operable by a novice, amateur, and others not versed in the art of surveying. Thus, a farmer or rancher who has a need for periodically re-charting the elevations of his land may inexpensively obtain the desired information. The elevations of land surveyed with the survey rod of the present invention is read directly from the indications on the rod without computation. The mechanations of the survey rod are easily understandable and the shifting and re-location of the indicating panels easily and quickly accomplished. Not only is the device of the present invention a boon to the novice but it is a big aid to the trained surveyor in obviating errors and waste of time incident to the computations required when conventional rods are employed.

Although I have herein shown and described my invention in what I have conceived to be the most practical and preferred embodiment, it is recognized that departures may be made therefrom within the scope of the invention, which is not to be limited to the details disclosed herein, but is to be accorded the full scope of the claims so as to embrace any and all equivalent devices and structures.

Having described my invention what I claim as new and desire to secure by Letters Patent is:

1. A survey rod comprising a predetermined number of elongated panels of substantially equal length having calibrations arranged longitudinally thereof, and means for holding the panels in substantial alignment individually in selected erect and inverted attitudes, the panels bearing consecutive, erectly positioned, individual panel designating numerals and inverted, individual panel designating numerals in excess of their respective erect numerals by the number of panels employed.

2. A survey rod comprising a plurality of elongated panels of equal length having calibrations arranged longitudinally thereof, each of the panels bearing an erect indicating numeral adjacent to one end and an inverted indicating numeral adjacent to the opposite end, the numerals on each panel being numerically separated by the number of the panels employed, and correspondingly positioned numerals of the plurality of panels being of sequence; and means for releasably holding the panels in erect alignment in endwardly abutting relation for removal of the endmost panel of the aligned panels and realignment thereof in inverted position at the opposite end of said aligned panels.

3. A survey rod comprising an elongated body of substantially rigid material having a guideway formed longitudinally thereof coextensive with the length of the body, a plurality of rectangular panels of equal length slideably fitted to the guideway in longitudinal alignment therewith, lips extended outwardly relative to the body from opposite end portions of the panels, the lips of adjacent panels being in abutting relation, clamps releasably mounted on the body in engagement with the endwardly disposed lips of the endmost of the aligned panels and releasably locking the panels therebetween against movement longitudinally of the body, the panels bearing consecutive individual panel designating numerals at corresponding ends and inverted individual panel designating numerals at their opposite ends, the inverted numerals being numerically in excess of their respective first named numerals by the total number of the panels employed.

4. A survey rod comprising a plurality of elongated panels of equal length having calibrations arranged longitudinally thereof, each of the panels bearing an erect indicating numeral adjacent to one end and an inverted indicating numeral adjacent to the opposite end, the numerals on each panel being numerically separated by the number of the panels employed, and correspondingly positioned numerals of the plurality of panels being of sequence, said panels each having lips outwardly extended from opposite end portions thereof; an elongated body member having a channel formed longitudinally therein slidably receiving the panels in endwardly aligned abutting relation; and a pair of clamps adjustably positioned longitudinally of the body member and having portions transversely disposed to the channel extended inwardly of the channel for engagement with the endmost lips of the endmost panels.

ROBERT E. WATTENBARGER.

REFERENCES CITED

The following references are of record in the file of this patent:

UNITED STATES PATENTS

| Number | Name | Date |
|---|---|---|
| 828,166 | Wiswall | Aug. 7, 1906 |
| 1,450,360 | Effertz | Apr. 3, 1923 |
| 1,843,035 | Link | Jan. 26, 1932 |
| 2,030,044 | Beghetti | Feb. 11, 1936 |
| 2,249,707 | Frost | July 15, 1941 |

FOREIGN PATENTS

| Number | Country | Date |
|---|---|---|
| 434,166 | Great Britain | Aug. 27, 1935 |